United States Patent
Igawa et al.

(10) Patent No.: US 10,844,917 B2
(45) Date of Patent: Nov. 24, 2020

(54) BRAKE CALIPER

(71) Applicant: ADVICS CO., LTD., Kariya-shi, Aichi-ken (JP)

(72) Inventors: Osamu Igawa, Toyota (JP); Shinichi Morita, Nagakute (JP)

(73) Assignee: ADVICS CO., LTD., Kariya (JP)

( * ) Notice: Subject to any disclaimer, the term of this patent is extended or adjusted under 35 U.S.C. 154(b) by 84 days.

(21) Appl. No.: 16/305,213

(22) PCT Filed: May 24, 2017

(86) PCT No.: PCT/JP2017/019324
§ 371 (c)(1),
(2) Date: Nov. 28, 2018

(87) PCT Pub. No.: WO2017/208921
PCT Pub. Date: Dec. 7, 2017

(65) Prior Publication Data
US 2020/0132141 A1    Apr. 30, 2020

(30) Foreign Application Priority Data

May 31, 2016 (JP) ................................. 2016-109472

(51) Int. Cl.
*F16D 55/228* (2006.01)
*F16D 65/00* (2006.01)
(Continued)

(52) U.S. Cl.
CPC ....... *F16D 65/0068* (2013.01); *F16D 55/228* (2013.01); *F16D 65/095* (2013.01);
(Continued)

(58) Field of Classification Search
CPC .. F16D 65/095; F16D 65/097; F16D 65/0974; F16D 65/0977; F16D 55/2265;
(Continued)

(56) References Cited

U.S. PATENT DOCUMENTS 3,980,160 A * 9/1976 Hoffmann ............. F16D 55/228
188/73.38
5,257,679 A * 11/1993 Weiler .................. F16D 55/226
188/73.32
(Continued)

FOREIGN PATENT DOCUMENTS

JP         2008-014486 A    1/2008
WO   WO-2012074108 A1 * 6/2012 ......... F16D 65/0979

*Primary Examiner* — Thomas J Williams
(74) *Attorney, Agent, or Firm* — Buchanan Ingersoll & Rooney PC

(57) ABSTRACT

A brake caliper according to this disclosure is, for example, equipped with: a body having a pair of side walls arranged with a gap therebetween, a peripheral wall running between the pair of side walls, wherein the pair of side walls and the peripheral wall enclose the peripheral edge portion of a disk rotor from the outside of the disk rotor in the radial direction; brake pads positioned between the side walls and the disk rotor; pistons that are supported by the side walls and that press the brake pads toward the side surfaces of the disk rotor by means of applied hydraulic pressure; and a shaft that supports the brake pads and passes through an opening provided in the side walls. The opening includes a retaining part that retains the shaft in the circumferential direction at two contact points separated from each other along the edge of the opening.

2 Claims, 5 Drawing Sheets

(51) Int. Cl.
*F16D 65/095* (2006.01)
*B60T 1/06* (2006.01)
*F16D 55/00* (2006.01)
*F16D 121/04* (2012.01)

(52) U.S. Cl.
CPC ....... *B60T 1/065* (2013.01); *F16D 2055/0016* (2013.01); *F16D 2121/04* (2013.01); *F16D 2200/003* (2013.01); *F16D 2200/0008* (2013.01); *F16D 2250/0007* (2013.01); *F16D 2250/0023* (2013.01)

(58) Field of Classification Search
CPC ............ F16D 55/22655; F16D 55/228; F16D 65/0068; F16D 2055/0016; F16D 2121/04; F16D 2200/0008; F16D 2200/003; F16D 2250/0007; F16D 2250/0023
USPC ........................................... 188/73.38, 73.44
See application file for complete search history.

(56) References Cited

U.S. PATENT DOCUMENTS

| | | | | |
|---|---|---|---|---|
| 7,267,208 B2 * | 9/2007 | Jedele | .................. | F16D 65/0977 188/73.38 |
| 2007/0272502 A1 * | 11/2007 | Kobayashi | ............ | F16D 65/095 188/73.45 |
| 2007/0278049 A1 | 12/2007 | Kobayashi et al. | | |
| 2010/0193300 A1 * | 8/2010 | Saito | ...................... | F16D 55/226 188/72.4 |
| 2010/0243384 A1 * | 9/2010 | Morita | .................. | F16D 55/228 188/73.1 |
| 2012/0298457 A1 * | 11/2012 | Ogawa | .................. | F16D 65/095 188/72.4 |
| 2014/0299424 A1 * | 10/2014 | Arakane | .............. | F16D 55/228 188/73.32 |
| 2020/0132141 A1 * | 4/2020 | Igawa | ................... | F16D 55/228 |

* cited by examiner

BRAKE CALIPER

TECHNICAL FIELD

The present disclosure relates to a brake caliper.

BACKGROUND ART

In the related art, a brake caliper is known in which a shaft supporting a brake pad passes through an opening provided in a body.

CITATION LIST

Patent Literature

PTL 1: JP-A-2008-14486

SUMMARY OF INVENTION

Technical Problem

In the related art, for example, it is desirable that wear or the like accompanying sliding between an outer surface of the shaft and an inner surface of the opening is less on either the outer surface or the inner surface.

Therefore, an object of the disclosure is, for example, to obtain a brake caliper having a new configuration with less inconvenience such as a brake caliper with less wear of a component.

Solution to Problem

According to the disclosure, there is provided a brake caliper including: a body which includes a pair of side walls disposed with a gap therebetween and a peripheral wall running between the pair of side walls, and in which the pair of side walls and the peripheral wall enclose a peripheral edge portion of a disk rotor from an outside of the disk rotor in a radial direction; brake pads positioned between the side walls and the disk rotor; pistons that are supported by the side walls and that press the brake pads against the side surfaces of the disk rotor by means of applied hydraulic pressure; and a shaft that supports the brake pads and passes through an opening provided in the side walls. The opening includes a retaining part that retains the shaft in a circumferential direction of the disk rotor at two contact points separated from each other along an edge of the opening.

In the brake caliper, at the time of braking or the like, the shaft is retained by the retaining part provided in the opening in the circumferential direction, and a movement thereof in the opening is suppressed. Therefore, according to the brake caliper, for example, wear of the outer surface of the shaft or the inner surface of the opening is suppressed.

In addition, in the brake caliper, for example, the opening includes a narrow part as the retaining part, of which a width is narrower toward one side in the circumferential direction.

According to the brake caliper, for example, the retaining part for retaining the shaft at the two contact points in the circumferential direction can be obtained with a relatively simple configuration.

In addition, for example, the brake caliper further includes an elastic member that presses the shaft against an inside or an outside of the edge of the opening in the radial direction, in which the retaining part is provided on a side of the edge of the opening where the elastic member presses the shaft.

According to the brake caliper, for example, since a distance in which the shaft moves along the edge of the opening is short, for example, wear of the outer periphery of the shaft or the edge of the opening is more easily suppressed. In addition, for example, it is possible to suppress an increase in an elastic force of the elastic member due to the movement of the shaft along the edge of the opening and eventually, energy consumed by the movement of the shaft can be reduced.

DESCRIPTION OF EMBODIMENTS

Hereinafter, an exemplary embodiment of the invention is disclosed. A configuration of the embodiment illustrated below, an operation and a result (effect) brought about by the configuration are an example. The invention can be realized by other than the configuration disclosed in the following embodiment. In addition, according to the invention, it is possible to obtain at least one of various effects (including derivative effects) obtained by the configuration. Moreover, in each drawing, an X direction, a Y direction, and a Z direction orthogonal to each other are illustrated for convenience.

Figure 1:
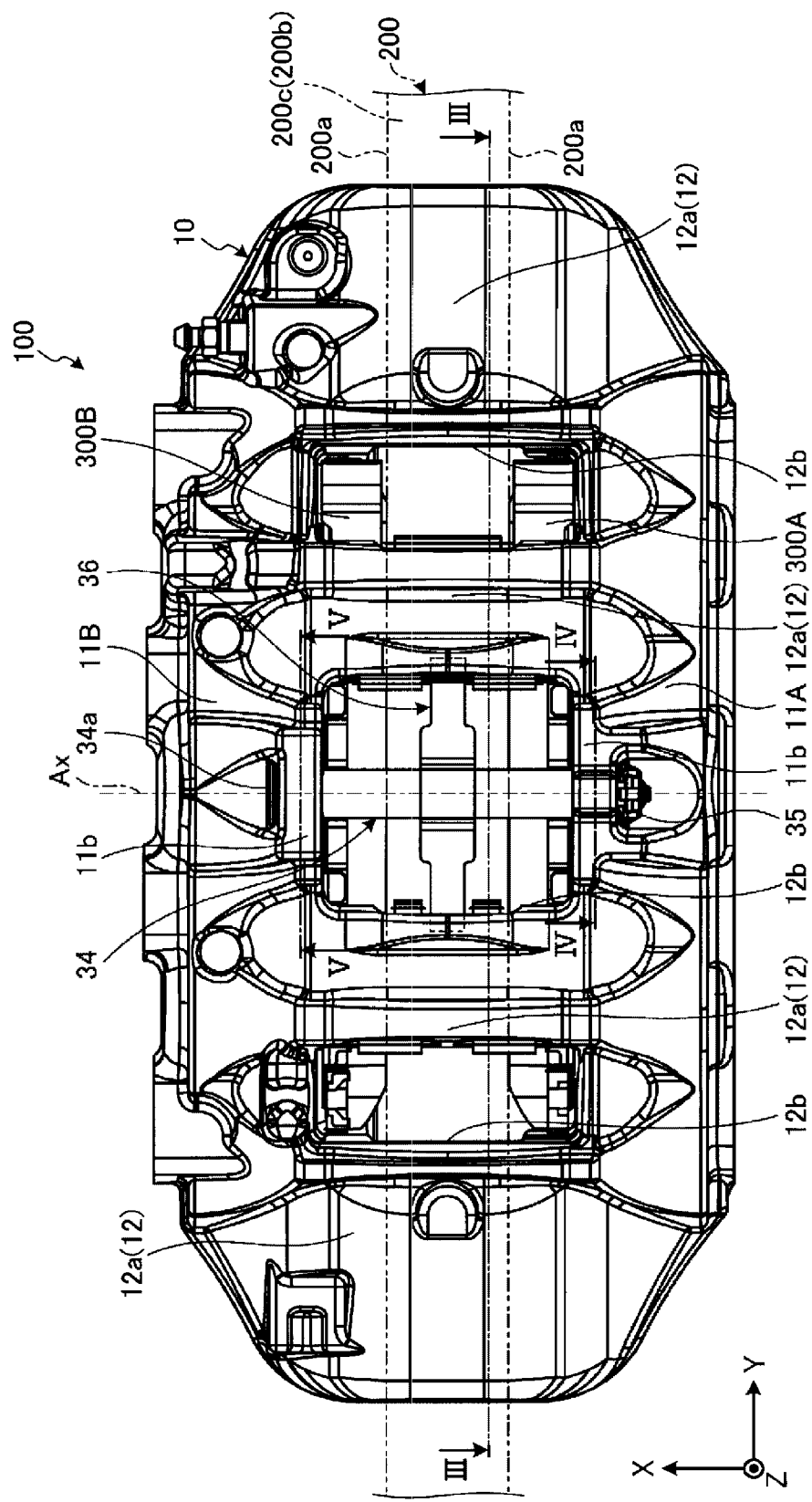
FIG. 1 is a schematic and exemplary external view of a brake caliper of an embodiment viewed from an outside of a disk rotor in a radial direction.
Figure 2:
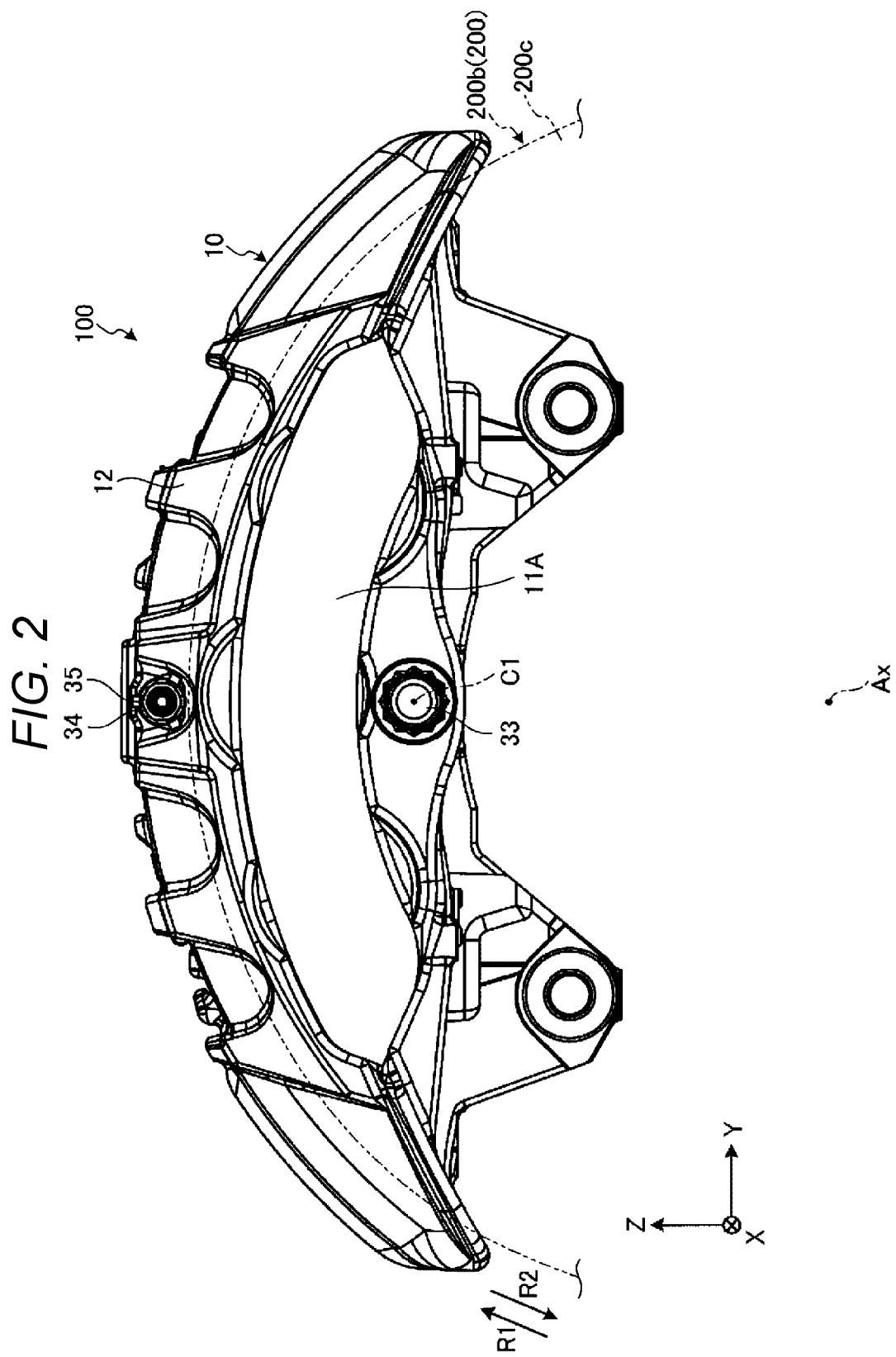
FIG. 2 is schematic and exemplary external view of the brake caliper of the embodiment viewed from a direction perpendicular to a side surface of the disk rotor.

FIG. 1 is a schematic and exemplary external view of a brake caliper 100 of the embodiment viewed from an outside of a disk rotor 200 in a radial direction. FIG. 2 is schematic and exemplary external view of the brake caliper 100 of a case where being viewed from an axial direction of the disk rotor 200. Moreover, in the following description, the axial direction of the disk rotor 200 is simply referred to as the axial direction, the radial direction of the disk rotor 200 is simply referred to as the radial direction, and the circumferential direction of the disk rotor 200 is simply referred to as the circumferential direction.

The disk rotor 200 rotates around a rotation center Ax illustrated in FIGS. 1 and 2 integrally with a rotating wheel (not illustrated) of a vehicle such as an automobile. The disk rotor 200 is a rotating body and a shape of the disk rotor 200 is a disc shape orthogonal to the rotation center Ax.

The disk rotor 200 includes two side surfaces 200a and a peripheral surface 200b. The two side surfaces 200a are orthogonal to the rotation center Ax. The shape of the two side surfaces 200a is an annular shape centered on the rotation center Ax and the two side surfaces 200a are parallel to each other. As illustrated in FIG. 2, the shape of the peripheral surface 200b is cylindrical centered on the rotation center Ax.

The brake caliper 100 is fixed to a non-rotation portion of the vehicle, for example, an axle hub (not illustrated). A body 10 of the brake caliper 100 extends in a circular arc shape along a peripheral edge portion 200c of the rotating disk rotor 200.

As illustrated in FIG. 1, the body 10 includes two side walls 11A and 11B, and a peripheral wall 12. The two side walls 11A and 11B are positioned on both sides in the X direction in FIG. 1 with a gap therebetween. In addition, the peripheral wall 12 connects between end portions on the same side of the two side walls 11A and 11B, that is, between end portions on the outside (or the Z direction) in the radial direction. The two side walls 11A and 11B, and the peripheral wall 12 are connected in a U shape. The U-shaped structure formed by the two side walls 11A and 11B, and the peripheral wall 12 cover the peripheral edge portion 200c of the disk rotor 200 with a gap from the outside in the radial direction. The side wall 11A is positioned separated from the peripheral edge portion 200c of the disk rotor 200 in a direction opposite to the X direction, and the side wall 11B is positioned separated from the peripheral edge portion 200c of the disk rotor 200 in the X direction. In addition, as illustrated in FIG. 2, the peripheral wall 12 is positioned on the outside of the peripheral surface 200b (peripheral edge portion 200c) of the disk rotor 200 in the radial direction. The body 10 partially covers the peripheral edge portion 200c of the disk rotor 200.

As illustrated in FIG. 1, the peripheral wall 12 includes a plurality of connecting parts 12a separated from each other in the circumferential direction (or the Y direction). The connecting part 12a extends along the axial direction (X direction). In the peripheral wall 12, an opening 12b is provided between two connecting parts 12a adjacent to each other in the circumferential direction. In the embodiment, the connecting part 12a and the opening 12b are alternately provided along the circumferential direction on the outside of the peripheral edge portion 200c of the disk rotor 200 in the radial direction. The connecting part 12a may be referred to as a coupling part, a bridge part, or the like.

The body 10 can be manufactured, for example, by various manufacturing methods such as casting and forging. The material of the body 10 is, for example, a metal material such as an iron-based material or an aluminum-based material.

Figure 3:
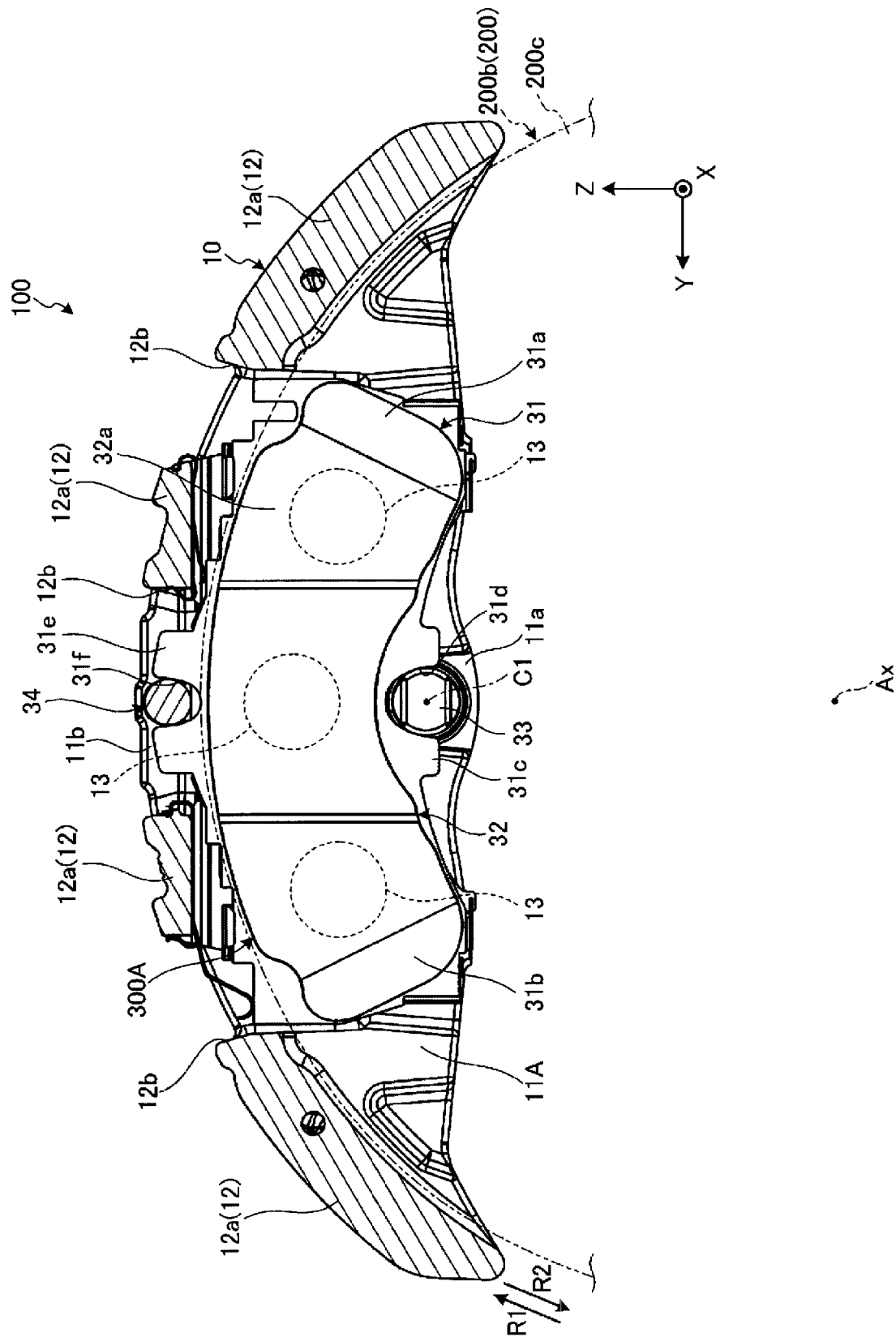
FIG. 3 is a sectional view that is taken along line of FIG. 1.

FIG. 3 is a sectional view that is taken along line of FIG. 1. As illustrated in FIG. 1, a brake pad 300A is disposed between the side wall 11A of the body 10 and the disk rotor 200, and a brake pad 300B is disposed between the side wall 11B of the body 10 and the disk rotor 200. FIG. 3 is a view in which the brake pad 300A is viewed in a direction (from a disk rotor 200 side) opposite to the X direction. Therefore, in FIG. 3, a sliding surface 32a of the brake pad 300A facing the side surface 200a of the disk rotor 200 is visible. Moreover, since the brake pad 300B has substantially the same shape as that of the brake pad 300A illustrated in FIG. 3, for the brake pad 300B, a view corresponding to FIG. 3 will be omitted.

As illustrated in FIG. 3, the brake pad 300A includes a back plate 31 and a lining 32.

The back plate 31 extends substantially in a circular arc shape with a substantially constant width along the peripheral edge portion 200c of the disk rotor 200. A shape of the back plate 31 is a thin plate shape in the axial direction (X direction). The back plate 31 includes a side surface 31a on the disk rotor 200 side, and a side surface 31b on a side opposite to the side surface 31a on the disk rotor 200 side, that is, on the side of the side walls 11A and 11B.

The lining 32 is fixed to the side surface 31a of the back plate 31 on the disk rotor 200 side. Three protruded portions are disposed in the lining 32 with respect to one back plate 31 with gaps along the circumferential direction (or the Y direction). The lining 32 covers the side surface 31a of the back plate 31 on the disk rotor 200 side. A shape of the lining 32 is a thin plate shape in the axial direction (X direction). The lining 32 has the sliding surface 32a. The sliding surface 32a is referred to as a braking surface.

In addition, FIG. 3, a piston 13 provided in the body 10 is schematically illustrated by a circle of a broken line. A cylinder (not illustrated) accommodating each piston 13 is provided in the body 10. The cylinder accommodates the piston 13 so as to be movable along the axial direction (X direction), that is, along a direction perpendicular to the side surface 200a (see FIG. 1) of the disk rotor 200, the side surface 31a of the back plate 31, and the sliding surface 32a of the lining 32.

In such a configuration, the piston 13, which moves along the axial direction as a hydraulic pressure of a hydraulic oil in the cylinder increases, presses each of the brake pads 300A and 300B against the disk rotor 200. Therefore, the sliding surfaces 32a of the linings 32 of the brake pads 300A and 300B are pressed against the side surface 200a of the disk rotor 200 and the rotation of the disk rotor 200 is suppressed by friction between the sliding surfaces 32a and the side surface 200a. In this way, the disk rotor 200, eventually, the wheel is braked by a brake device including the brake caliper 100, and the vehicle decelerates. The side surface 200a of the disk rotor 200 may be referred to as a braked surface.

In addition, as illustrated in FIG. 3, an end portion 31c of an inside (direction opposite to the Z direction) of the brake pad 300A in the radial direction is supported by an inner shaft 33.

The inner shaft 33 protrudes from an end portion 11a of an inside (direction opposite to the Z direction) of the side wall 11A of the body 10 in the radial direction along the axial direction (X direction) in a direction close to the disk rotor 200. The inner shaft 33 is positioned at a center portion of the side wall 11A in the circumferential direction (or the Y direction). In addition, the inner shaft 33 is formed in a substantially circular columnar shape.

A notch 31d (opening) that is opened in a V-shape toward the inside in the radial direction is provided at the end portion 31c of the inside (direction opposite to the Z direction) of the back plate 31 in the radial direction. The inner shaft 33 is accommodated in the notch 31d.

Although not illustrated, the brake pad 300B is supported by the side wall 11B of the body 10 by a configuration similar to the brake pad 300A. That is, another inner shaft having the substantially same configuration as that of the inner shaft 33 protrudes from an end portion of an inside (direction opposite to the Z direction) of the side wall 11B of the body 10 in the radial direction along the axial direction (direction opposite to the X direction) in a direction close to the disk rotor 200. The inner shaft 33 and the other inner shaft are positioned on sides opposite to each other across the disk rotor 200 and protrude from the side walls 11A and 11B of the body 10 in a direction close to each other.

In addition, end portions 31e of an outside (Z direction) of the brake pad 300A in the radial direction are respectively supported by an outer shaft 34.

As illustrated in FIG. 1, the outer shaft 34 extends along the axial direction (X direction) between end portions 11b of the outside (Z direction) of the side walls 11A and 11B of the body 10 in the radial direction in the opening 12b positioned at a center in the circumferential direction among a plurality of openings 12b provided on the peripheral wall 12 of the body 10. The outer shaft 34 is formed in a substantially circular columnar shape.

As illustrated in FIG. 3, a notch 31f (opening) that is opened in a V-shape toward the outside in the radial direction is provided at the end portion 31e of the outside (Z direction) of the brake pad 300A in the radial direction. The outer shaft 34 is accommodated in the notch 31f.

Although not illustrated, the brake pad 300B is supported by the outer shaft 34 by a configuration similar to the brake pad 300A.

In a support structure of the brake pads 300A and 300B by the body 10 described above, the brake pads 300A and 300B are supported so as to be swingable about a center C1 of the inner shaft 33 parallel to the axial direction.

Figure 4:
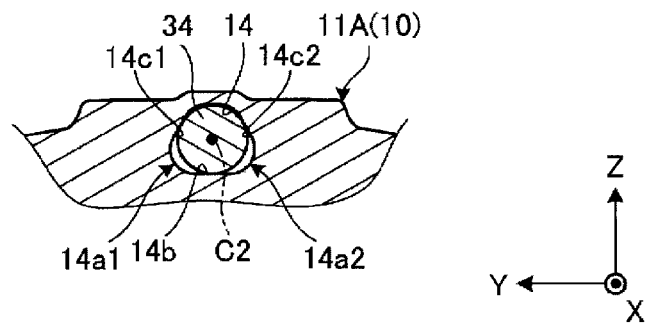
FIG. 4 is a sectional view that is taken along line IV-IV of FIG. 1.
Figure 5:
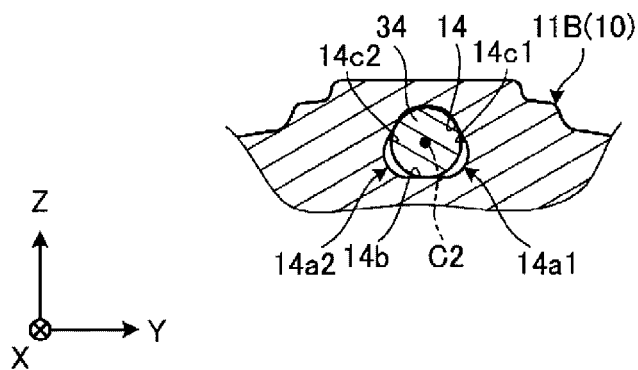
FIG. 5 is a sectional view that is taken along line V-V of FIG. 1.

FIG. 4 is a sectional view that is taken along line IV-IV of FIG. 1 and FIG. 5 is a sectional view that is taken along line V-V of FIG. 1. FIG. 4 is a sectional view of a portion where a through-hole 14 is provided in the side wall 11A of the body 10, and FIG. 5 a sectional view of a portion where a through-hole 14 is provided in the side wall 11B of the body 10.

As illustrated in FIGS. 4 and 5, the outer shaft 34 passes through the through-holes 14 provided in the side walls 11A and 11B. The outer shaft 34 is elastically pressed against a portion of an inside (direction opposite to the Z direction) in the radial direction of an edge of the through-hole 14 by a leaf spring 36 (elastic member, see FIG. 1) which is supported by the body 10.

In addition, as illustrated in FIG. 1, an enlarged diameter part 34a is provided at one end of the outer shaft 34 in the axial direction, for example, at an end portion in the X direction. In addition, as illustrated in FIGS. 1 and 2, a clip 35 (locking member) having a larger diameter than an outer diameter of the outer shaft 34 is attached to the other end of the outer shaft 34 in the axial direction, for example, to an end portion in a direction opposite to the X direction. The enlarged diameter part 34a and the clip 35 prevent the outer shaft 34 from falling out of the through-holes 14 of the side walls 11A and 11B. Since the outer shaft 34 is inserted into the through-hole 14, a size of the through-hole 14 is set larger than the outer diameter of the outer shaft 34.

In a case where the piston 13 presses the brake pads 300A and 300B against the disk rotor 200, a frictional force acts on the brake pads 300A and 300B from the disk rotor 200 along the circumferential direction (tangential direction). Here, as described above, the brake pads 300A and 300B are supported by the outer shaft 34. In addition, the outer shaft 34 is accommodated in the through-hole 14 with a gap in consideration of dimensional tolerances and ease of assembling. Therefore, the outer shaft 34 is pressed from the brake pads 300A and 300B in the circumferential direction and moves in the through-hole 14 in the circumferential direction.

The inventors of the present invention have conducted studies on such a configuration and found that wear on the inner surface of the through-hole 14 or the outer surface (peripheral surface) of the outer shaft 34 may be promoted easily in the configuration and situation in which the outer shaft 34 receiving a force from the brake pads 300A and 300B moves along the inner surface (edge) of the through-hole 14 of the body 10. In addition, the inventors of the present invention have found that the longer the distance moved, the more easily the wear is promoted.

As a result of the investigation of countermeasures, the inventors of the present invention have found that it is possible to suppress the wear on the inner surface of the through-hole 14 or the outer surface of the outer shaft 34 by limiting the movement of the outer shaft 34 in the through-hole 14 in the circumferential direction.

Specifically, as illustrated in FIGS. 4 and 5, narrow parts 14a1 and 14a2 of which widths (widths in the radial direction) are narrowed as going toward the circumferential direction are provided on both sides of the through-hole 14 in the circumferential direction. That is, the inner surface of the through-hole 14 includes a first edge 14b that is positioned on the inside (direction opposite to the Z direction) in the radial direction, and second edges 14c1 and 14c2 that are positioned on the outside (Z direction) in the radial direction and on both sides (Y direction and a direction opposite to the Y direction) in the circumferential direction, and are inclined with respect to the circumferential direction. The first edge 14b, and the second edges 14c1 and 14c2 configure corner portions of the through-hole 14, that is, the narrow parts 14a1 and 14a2 which are narrowed toward the circumferential direction as viewed from the axial direction (in the view of FIGS. 4 and 5).

Figure 6:
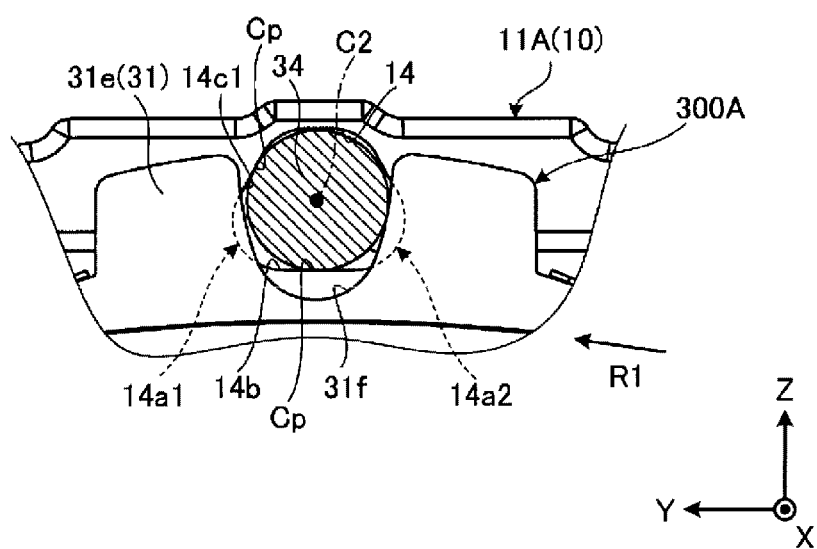
FIG. 6 is a partial enlarged view of FIG. 3 and is a view in a state where the disk rotor rotates in a direction R1 of FIGS. 2 and 3.
Figure 7:
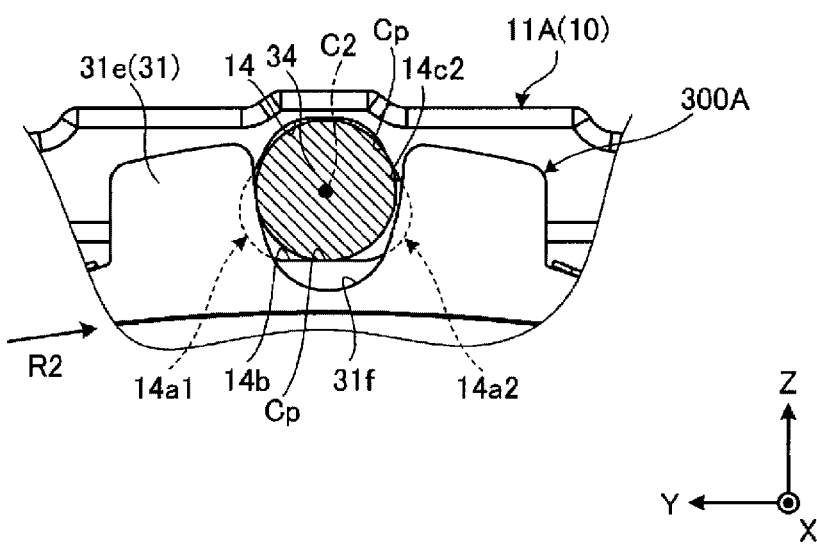
FIG. 7 is a partial enlarged view of FIG. 3 and is a view in a state where the disk rotor rotates in a direction R2 of FIGS. 2 and 3.

FIGS. 6 and 7 are partial enlarged views of FIG. 3. FIG. 6 is a view in a state where the disk rotor rotates in a direction R1 of FIGS. 2 and 3, and FIG. 7 is a view in a state where the disk rotor rotates in a direction R2 of FIGS. 2 and 3.

In a state where the disk rotor 200 rotates in the direction R1 of FIG. 2, when the brake pads 300A and 300B are pressed by the piston 13 against the disk rotor 200, as illustrated in FIG. 6, the outer shaft 34 moves in the direction R1 in the through-hole 14 and is retained in the narrow part 14a1. That is, the outer shaft 34 is sandwiched between the first edge 14b and the second edge 14c1 of the through-hole 14.

On the other hand, in a state where the disk rotor 200 rotates in the direction R2 of FIG. 2, when the brake pads 300A and 300B are pressed by the piston 13 against the disk rotor 200, as illustrated in FIG. 7, the outer shaft 34 moves in the direction R2 in the through-hole 14 and is retained in the narrow part 14a2. That is, the outer shaft 34 is sandwiched between the first edge 14b and the second edge 14c2 of the through-hole 14.

As described above, when the outer shaft 34 moves in the through-hole 14, the outer shaft 34 is temporarily retained in the narrow parts 14a1 and 14a2. The retaining state of the outer shaft 34 by the narrow parts 14a1 and 14a2 can be easily canceled by, for example, a change in a rotation direction of the disk rotor 200, a change in an acceleration of the vehicle, or the like.

As described above, in the embodiment, the through-hole 14 (opening) provided in the body 10 includes, for example, the narrow parts 14a1 and 14a2 (retaining parts) of which the widths are narrowed as going toward one side of the circumferential direction.

Therefore, at the time of braking, the outer shaft 34 supported by the body 10 is retained (pinched) at two contact points Cp (support points, retaining points, and contact regions) separated from each other in the narrow parts 14a1 and 14a2, that is, the contact point Cp (FIGS. 6 and 7) with the outer shaft 34 in the first edge 14b, the contact point Cp (FIG. 6) with the outer shaft 34 in the second edge 14c1, or the contact point Cp (FIG. 7) with the outer shaft 34 in the second edge 14c2, and the movement thereof is limited in the through-hole 14. Therefore, for example, the wear on the outer surface of the outer shaft 34 or the inner surface of the through-hole 14 due to the movement of the outer shaft 34 in the through-hole 14 is suppressed. In addition, for example, the vibration of the brake pads 300A and 300B is, suppressed by retaining the outer shaft 34 by the narrow parts 14a1 and 14a2, so that occurrence of a sound caused by the vibration of the brake pads 300A and 300B, for example, a so-called braking sound is suppressed.

In addition, in the embodiment, it is possible to obtain relatively easily the two contact points separated from each other in the through-hole 14 by providing the narrow parts 14a1 and 14a2 in the through-hole 14.

In addition, the brake pads 300A and 300B receive the frictional force from the disk rotor 200. In this case, the outer shaft 34 relatively moves along the inner surface of the through-hole 14. As described above, in the configuration in which the leaf spring 36 applies the elastic force to the inside of the outer shaft 34 in the radial direction and the outer shaft 34 is elastically pressed against the first edge 14b of the through-hole 14, the outer shaft 34 moves along the first edge 14b.

Here, in a case where the narrow parts 14a1 and 14a2 are positioned on the outside of a center C2 of the through-hole 14 in the radial direction, a distance that the outer shaft 34 moves to the narrow parts 14a1 and 14a2 along the first edge 14b is longer than that of a case where the narrow parts 14a1 and 14a2 are positioned on the inside of the center C2 of the through-hole 14 in the radial direction as in the embodiment. Furthermore, in this case, the outer shaft 34 moves to the narrow parts 14a1 and 14a2 while increasing the elastic pressing force by the leaf spring 36 against the elastic force of the leaf spring 36.

In this regard, in the embodiment, the narrow parts 14a1 and 14a2 extend from the center C2 of the through-hole 14 (opening) toward the inside in the radial direction, and is positioned on the inside from the center C2 in the radial direction. That is, the narrow parts 14a1 and 14a2 are provided on a side on which the outer shaft 34 is pressed by the leaf spring 36 (elastic member) on the inner surface of the through-hole 14. Therefore, the distance that the outer shaft 34 moves along the first edge 14b can be further shortened. In addition, it is possible to suppress an increase in the elastic force of the leaf spring 36 due to the movement of the outer shaft 34. Therefore, the wear of the outer surface of the outer shaft 34 or the inner surface of the through-hole 14 is further suppressed. In addition, for example, energy consumed by the movement of the outer shaft 34, that is, energy loss may be reduced. Moreover, the center C2 is a geometric center of gravity (center) when viewed from the axial direction of the through-hole 14.

Although the embodiments of the invention are described above, the above embodiments are merely examples, and the scope of the invention is not intended to be limited. The above embodiments can be implemented in various other forms and can be omitted, replaced, combined, and modified in various ways without departing from the gist of the present invention. In addition, each configuration element, numerical value, condition, and the like can be changed as appropriate.

For example, in the above embodiments, an example of application to a configuration in which the brake pad is swingably supported on the body are disclosed, but the invention can be applied to a configuration in which the shaft provided in the body is inserted into the opening provided in the brake pad, regardless of the support mode by the body of the brake pad.

In addition, the retaining part may have two contact points separated from each other, and is not limited to the narrow part disclosed in the above embodiment. For example, the inner surface (edge) of the opening may be a curved surface with a radius of curvature larger than the outer diameter of the shaft, or may be a flat surface. The narrow part may not have a triangular-shaped apex. Also, the opening may not be the through-hole, for example, such as a notch or a recessed part.

For example, in a configuration in which the elastic member presses the shaft passing through the opening against the edge on the outside of the opening in the radial direction, the retaining part or the narrow part is provided on the outside of the edge of the opening in the radial direction. Moreover, the elastic member is not limited to the leaf spring and may be, for example, a line spring or a coil spring.

The invention claimed is:

1. A brake caliper comprising:
   a body which includes a pair of side walls disposed with a gap therebetween and a peripheral wall running between the pair of side walls, and in which the pair of side walls and the peripheral wall enclose a peripheral edge portion of a disk rotor from an outside of the disk rotor in a radial direction;
   brake pads positioned between the side walls and the disk rotor;
   pistons that are supported by the side walls and that press the brake pads against side surfaces of the disk rotor by means of applied hydraulic pressure; and
   a shaft that supports the brake pads and passes through an opening provided in the side walls,
   wherein the opening includes a retaining part that retains the shaft in a circumferential direction of the disk rotor at two contact points separated from each other along an edge of the opening, and
   wherein the opening includes a narrow part as the retaining part, of which a width is narrower toward one side in the circumferential direction.

2. The brake caliper according to claim 1, further comprising:
   an elastic member that presses the shaft against an inside or an outside of the edge of the opening in the radial direction,
   wherein the retaining part is provided on a side of the edge of the opening where the elastic member presses the shaft.

\* \* \* \* \*